May 18, 1926.  1,585,401
F. L. MAIN
WHEEL
Filed April 2, 1923

INVENTOR.
Frank L. Main
Edward N. Pagelsen
ATTORNEY.

Patented May 18, 1926.

1,585,401

UNITED STATES PATENT OFFICE.

FRANK L. MAIN, OF BIRMINGHAM, MICHIGAN, ASSIGNOR TO HAYES WHEEL COMPANY, OF JACKSON, MICHIGAN, A CORPORATION OF MICHIGAN.

WHEEL.

Application filed April 2, 1923. Serial No. 629,279.

This invention relates to the construction of vehicle wheels having cast metal hubs, sheet metal discs or webs and tire-supporting rims attached to the peripheries of the discs, and the object of this invention is to provide a wheel of this character in which the radial cross section of the disc shall be a reverse curve and therefore have great stiffness to resist endwise or axial thrusts.

Figure 1:
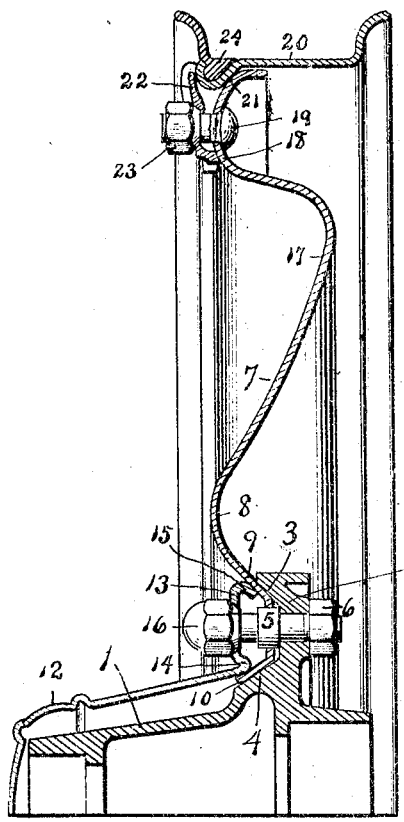
Figure 2:
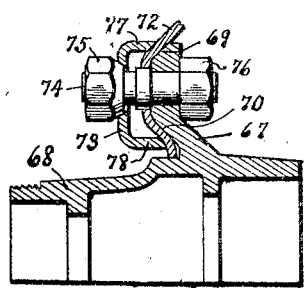

In the accompanying drawings, Fig. 1 is an axial half section of a wheel embodying the present invention. Fig. 2 is a sectional view of a modified form of hub construction.

Similar reference characters refer to like parts throughout the several views.

In Fig. 1 the hub 1 is formed with a flange 2 provided with conical bearing faces 3 and 4 between which bolts 5 are secured in position by nuts 6. The disc 7 embodies a circular arch 8 adjacent the flange 2 and two conical portions 9 and 10 adapted to engage the conical surfaces 3 and 4 of the flange 2. The hub cap 12 has a flange 13 which comprises a circular rib 14 and an inturned edge 15, both of which are pressed against the conical portions 9 and 10 by the nuts 16 which therefore secure the disc to the hub.

Outside of the circular arch 8 the disc is formed with a reverse curve 17 which merges into an arched ring 18 perforated to receive bolts 19. The periphery of the disc contacts with the well known removable rim 20 along a line 21, the rim being secured in position by means of rim clamps 22 and nuts 23. It will be noticed that the flange 2 on the hub is substantially central with the rim 20. I prefer to form the inner ends of the nuts 16 and the seats therefor in the flange 13 conical so that the cap 12 and flange 13 can be readily centered on the hub. The rim 20 is provided with a split ring 24 as usual.

The construction shown in Fig. 2 is somewhat similar to that shown in Fig. 1. The flange 67 on the hub 68 has two approximately conical bearing surfaces 69 and 70 which fit the inner side of the inner edge of the disc 72 which is held in position by the clamping ring 73, bolts 74 and nuts 75, the bolts being secured in position by means of nuts 76. The clamping ring has flanges 77 and 78 which fit the disc and cause a rigid engagement between it and the hub. In this embodiment the nuts 75 are again shown to have conical engaging surfaces to fit corresponding surfaces on the clamping ring which permits the holes in the clamping ring to be quite large.

In each of these structures the hub is provided with a circumferential flange to support the inner or central portion of the disc. The disc is formed with a circular arch and the metal of the disc extends from the flange on the hub tangentially to this arch. Outside of the arch the disc is reversely curved toward the outer face of the wheel.

The details pertaining to this structure and the proportions of the parts, however, may all be changed by those skilled in the art without departing from the spirit of my invention as set forth in the following claims.

I claim:—

1. In a vehicle wheel, the combination of a disc, a rim attached to the outer edge thereof, and a hub secured to the center of the disc, said disc being formed with a connected pair of circular arches having their crowns in opposite directions, said hub having a flange provided with two conical bearing surfaces inclined in opposite directions and the central portion of said disc being formed to fit said conical faces.

2. In a vehicle wheel, the combination of a disc, a rim attached to the outer edge thereof, a hub secured to the center of the disc, said disc being formed with a connected pair of circular arches having their crowns in opposite directions, said hub having a flange provided with two conical bearing surfaces inclined in opposite directions and the central portion of said disc being formed to fit said conical faces, a hub cap extending around the outer end of the hub and having a flange at its inner end, and a bolt to secure the hub cap, the flange on the hub and the inner portion of said disc together.

3. In a vehicle wheel, the combination of a disc, a rim attached to the outer edge thereof, a hub secured to the center of the disc, said disc being formed with a connected pair of circular arches having their crowns in opposite directions, said hub having a flange provided with two conical bearing surfaces inclined in opposite directions and the central portion of said disc being formed to fit said conical faces, a hub cap enclosing the outer end of the hub and terminating at its open end in a circumferential flange having conical bearing surfaces adapted to cooperate with the conical bearing surfaces on the flange on the hub to secure the disc to the hub, and means for pressing the flange on the hub cap toward the flange on the hub.

4. In a wheel, the combination of a hub having a circumferential flange provided with a pair of circumferential substantially conical bearing surfaces, a disk having a circular portion at its inner edge adapted to fit against the substantially conical surfaces of the flange, a retaining member having flanges adapted to fit the said circular portion of the disk, and means to secure the retaining member and disc to the flange.

5. In a wheel, the combination of a hub having a circumferential flange provided with a pair of circumferential substantially conical bearing surfaces, a disk having a pair of circular substantially conical portions adapted to fit against the substantially conical surfaces of the flange, a retaining member having circular flanges adapted to bear against the said substantially conical portions of the disc, and means to secure said parts together comprising bolts and nuts thereon having tapering conical engaging surfaces adapted to contact with the walls of holes in said retaining member.

FRANK L. MAIN.